Aug. 4, 1953     E. PAULSON     2,647,390
BICYCLE LOCK
Filed March 28, 1950
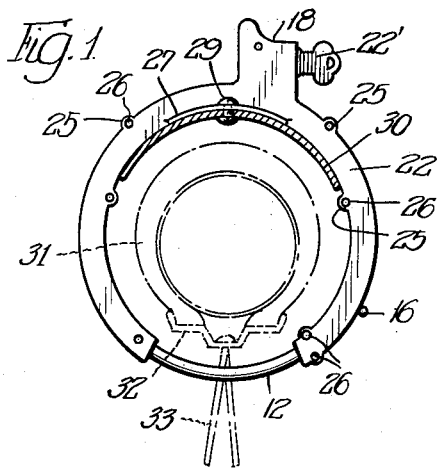
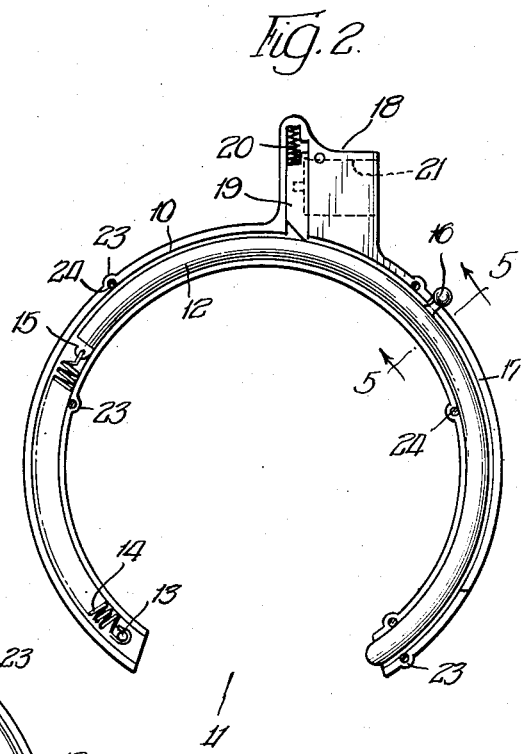
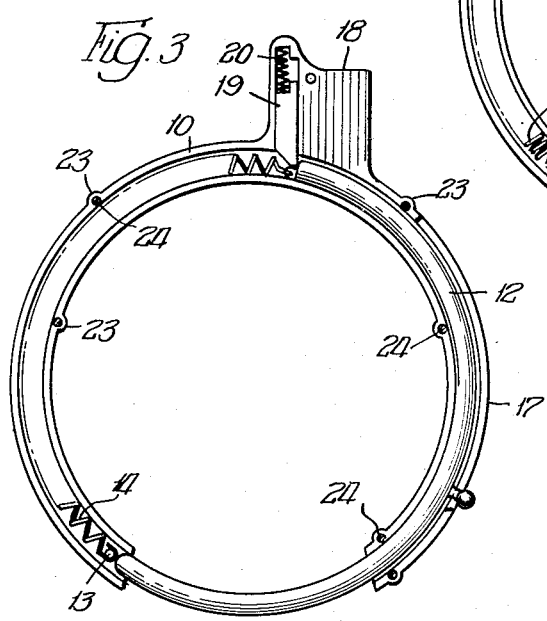
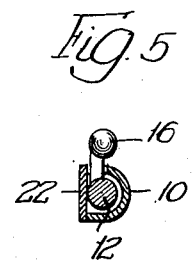
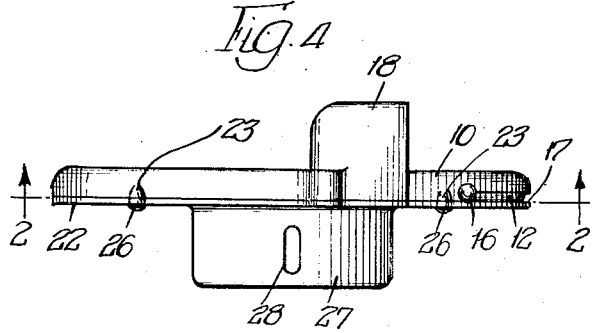
INVENTOR.
Ernest Paulson.

Patented Aug. 4, 1953

2,647,390

UNITED STATES PATENT OFFICE 2,647,390

BICYCLE LOCK

Ernest Paulson, Chicago, Ill.

Application March 28, 1950, Serial No. 152,431

3 Claims. (Cl. 70—227)

The present invention relates to bicycle locks and has for its main object the provision of a bicycle lock of the type which may be rigidly affixed to a bicycle mud guard, and which may be provided with a retractable bolt shiftable between the wheel spokes in a transverse relation for the purpose of rendering a bicycle wheel inoperative.

Another object of the present invention is the provision in a bicycle lock of the type indicated of an annular casing broken at a portion of its periphery for providing a space for shifting thereinto a bolt or for retracting the same therefrom.

A still further object of the present invention is the provision in a lock of the type indicated of suitable means for maintaining the bolt in its extended position and for automatically retracting the same when said means is rendered inoperative.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views:

Fig. 1 is a face elevational view of the present lock, in an operative position with a bicycle wheel;

Fig. 2 is an enlarged face elevational view of the lock while in an inoperative position with the cover plate removed therefrom, the view having been taken on line 2—2 of Fig. 4;

Fig. 3 is a similar view with the lock in an operative position;

Fig. 4 is a top elevational view of the lock; and

Fig. 5 is a transverse cross-sectional view through the lock, taken on line 5—5 of Fig. 2.

Referring in detail to the present drawing there is shown therein a lock which includes an arcuate casing 10, which on transverse cross-section is substantially semi-annular, as is clearly seen in Fig. 5. The ends of said casing 10 are spaced for defining recess 11. Receivable within said casing 10 is arcuate bolt 12 for shifting movement therewithin. Rigidly positioned within one end of said casing 10 is pin 13, to which one end of coil spring 14 is affixed. The adjacent end of said bolt 12 is provided with a reduced lug 15, to which the opposite end of said coil spring 14 is affixed. Extending from a point of the periphery of said bolt 12, substantially centrally thereof, is knob 16, which extends through recess 17 made at the outer portion of said casing 10, and along its rim.

Integrally formed with said casing 10, and outwardly extending therefrom substantially from its central portion, is lock casing 18, within which lock bolt 19 is positioned for sliding movement to or away from said bolt 12. Coil spring 20 positioned within said casing 18 normally bears against said bolt 19 urging the same into an extended operative position. Lock mechanism 21, not shown in detail in the drawing, operable by key 22', receivable within a key hole made in casing 18, actuates said lock bolt 19 for bringing the same into its inoperative position, shown in Fig. 2, against the tension of coil spring 20.

A flat cover plate 22, of the contour corresponding to the contour of the bicycle lock, including casings 10 and 18, is provided, for covering said casings 10 and 18 and for maintaining bolts 12 and 19 in position. Said casing 10, along its inner and outer rims is provided with a plurailty of bulges 23, extending outwardly of said casing 10 for effecting strengthening bases for rivet pins 24 from which the same project. Said rivet pins 24 are extended through like bulges 25 made in said plate 22, and outwardly of said plate 22 the ends of said rivet pins 24 are formed into rivet heads 26 for maintaining said plate 22 in a rigid relative position with said casing 10.

Cover plate 22, along the inner margin of its periphery, and substantially opposite of lock casing 18, is provided with an integrally formed mud guard engaging plate 27, laterally extending from said cover plate 22. Said plate 27 is provided with a slot 28 through which rivet 29 is passed. Said rivet 29 is also extended through mud guard 30 of a bicycle wheel, whereby the lock assembly is maintained rigid with relation to the bicycle wheel and in a transverse relation therewith.

To position the bicycle lock upon a bicycle wheel, the bicycle tire shoe 31 and the wheel rim 32 are passed through recess 11, with the tire preferably in a deflated condition, and at a point free from the overhanging mud guard 30. Thereupon the lock assembly is shifted over mud guard 30, and thereupon riveted thereto by means of rivet 29, recess 11 being sufficiently wide for permitting passage therethrough of the deflated bicycle tire and wheel rim 32. In the operative position of the lock with relation to the bicycle wheel, the former will remain in a transverse relation with the latter, with bolt 12 shiftable between spokes 33, so that when said bolt 12 is shifted into its operative position, shown in Figs. 1 and 3, the same will remain in a transverse relation with the spokes preventing the bicycle wheel from turning in either direction, because the spokes coming in contact with bolt 12 will prevent turning of the wheel.

To bring bolt 12 into its outwardly shifted, operative position, knob 16 is manually grasped and shifted along recess 17 towards the adjacent free end of casing 10, until the outer free end of said bolt 12 enters the opposite end of said casing 10 and comes in contact with pin 13. When this takes place, the opposite inner end of bolt 12 has passed lock bolt 19, and the latter springs inwardly of casing 10, in the path of bolt 12, barring the retraction of the latter, notwithstanding the pull exerted thereon by coil spring 14, as is seen in Fig. 3. In that operative position of bolt 12 the same remains in the path of spokes 33 as seen in Fig. 1, preventing the rotation of the bicycle wheel, as was hereinabove described. Upon withdrawal of key 22' from lock casing 18, lock bolt 19, due to the tension of spring 20 thereon, will remain in its operative position shown in Fig. 3.

When it is desired to render the bicycle lock inoperative for withdrawal of bolt 12 from recess 11, key 22' is inserted into the keyhole in lock casing 18, and upon turning of the key lock mechanism 21 is actuated for shifting lock bolt 19 into its inoperative position, against the tension of spring 20, for moving said lock bolt 19 from the path of bolt 12 and from its engagement therewith. Once said lock bolt 19 has been shifted into its inoperative position, shown in Fig. 2, bolt 12 automatically and immediately shifts back due to the tension thereon by spring 14, knob 16 coming in contact with the body portion of casing 10, adjacent the end of recess 17, is prevented from further backward shifting.

From the hereinabove description it will be seen that the length of bolt 12 is predetermined. The length thereof equals the distance between pin 13 and lock bolt 19, measured on the side of the bicycle lock at which knob 16 is located.

While there is described herein preferred embodiments of the present invention, it is nevertheless to be understood that minor changes may be made therein without departing from the spirit and scope of the invention as claimed.

What I claim as new is:

1. A bicycle lock comprising an open faced arcuate casing having its ends in a spaced relation, an arcuate bolt shiftable within said casing, a coil spring attached by one of its ends to one end of said casing and by the other end to the adjacent end of said bolt, said spring normally urging said bolt into a retracted position, said casing being provided with a longitudinal recess, a knob affixed to said bolt and extending through said recess, on manual pulling of said knob said bolt being capable of shifting against the action of said spring into an extended position, in that latter position said bolt bridging the spaced ends of said casing, a spring actuable lock bolt entering said casing in the path of said bolt for maintaining the same in an extended position, means for retracting said lock bolt for permitting shifting of said bolt into its retracted position, a plate rigidly affixed to said casing for covering the open face of the latter, and a bicycle mud guard engaging plate integrally formed with and extending at right angle from said last named plate, said mud guard engaging plate being provided with a slot for receiving therethrough a fastener for engaging the mud guard with said mud guard engaging plate.

2. A bicycle lock comprising an open faced arcuate casing having its ends in a spaced relation, an arcuate bolt within said casing, means for normally maintaining said bolt in a retracted position, means for shifting said bolt out of said casing for bridging the ends of said casing, a cover plate rigidly affixed to said casing for covering the open face of the latter, and a bicycle mud guard engaging plate integrally formed with and extending at right angle from said cover plate, said mud guard engaging plate being provided with a slot for receiving therethrough a fastener for engaging the mud guard with said mud guard engaging plate.

3. A bicycle lock comprising an open faced arcuate casing having its ends in spaced relation, an arcuate bolt slidably mounted within said casing, means for normally maintaining said bolt in a retracted position, means for shifting said bolt out of said casing into bridging relation between the ends thereof, a cover plate rigidly fixed to the casing for closing the open face of the latter, and a mud guard engaging plate concentric with the arcuate casing and extending laterally from the inner edge of said cover plate and rigid therewith to fit upon the bicycle mud guard and to be secured thereto.

ERNEST PAULSON.

References Cited in the file of this patent

UNITED STATES PATENTS

| Number | Name | Date |
|--------|------|------|
| 438,526 | Butler | Oct. 14, 1890 |

FOREIGN PATENTS

| Number | Country | Date |
|--------|---------|------|
| 10,415 | Great Britain | July 5, 1890 |
| 40,563 | Denmark | Aug. 5, 1929 |
| 327,058 | Italy | July 2, 1935 |